No. 666,158. Patented Jan. 15, 1901.
F. H. ROBINSON.
ANIMAL POKE.
(Application filed Aug. 21, 1900.)
(No Model.)
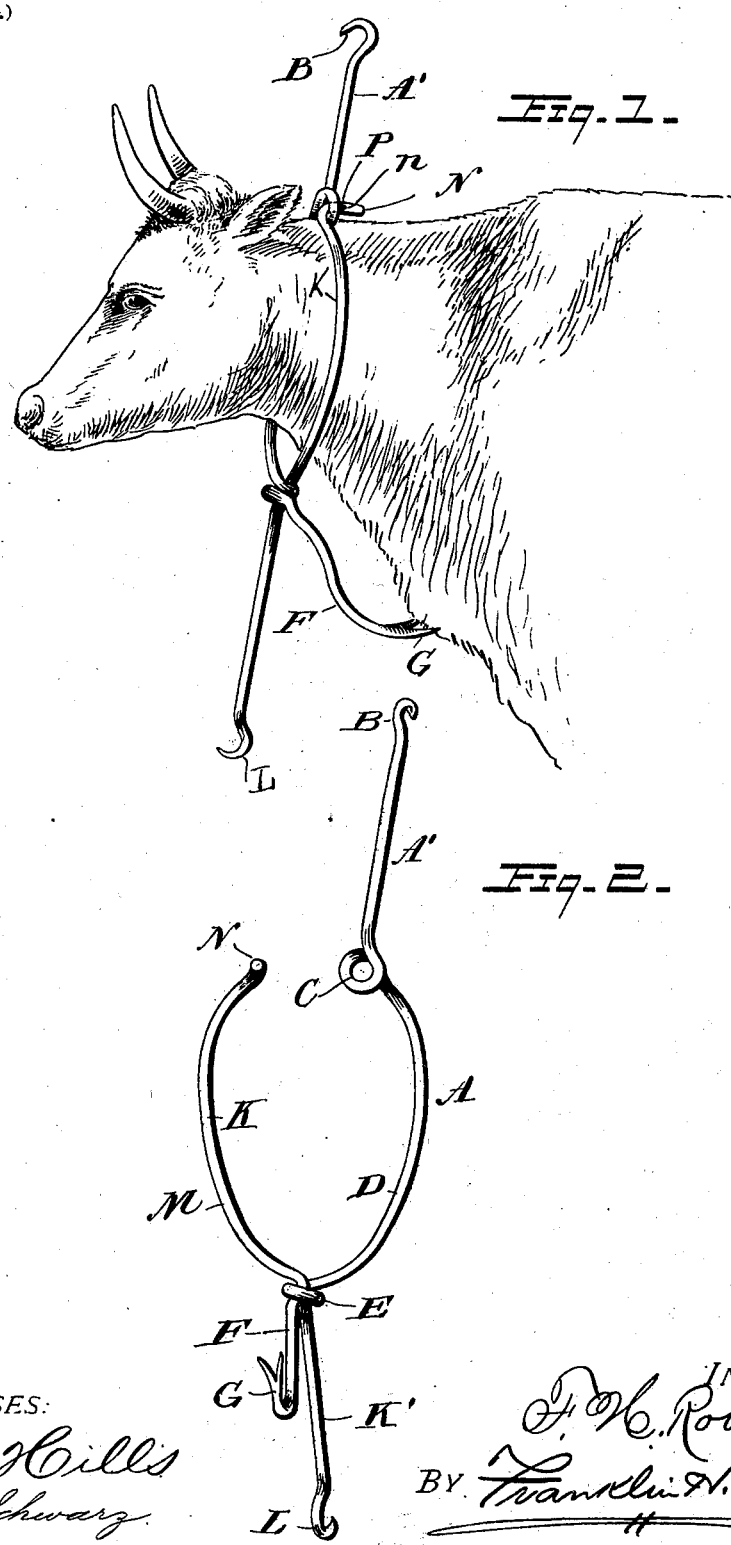

UNITED STATES PATENT OFFICE.

FRANK H. ROBINSON, OF NORTON, KANSAS, ASSIGNOR OF ONE-HALF TO J. W. LAWRENCE, OF SAME PLACE.

ANIMAL-POKE.

SPECIFICATION forming part of Letters Patent No. 666,158, dated January 15, 1901.

Application filed August 21, 1900. Serial No. 27,618. (No model.)

*To all whom it may concern:*

Be it known that I, FRANK H. ROBINSON, a citizen of the United States, residing at Norton, in the county of Norton and State of Kansas, have invented certain new and useful Improvements in Animal-Pokes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in pokes, and especially to an animal-poke which is made up of two pieces of wire which are pivoted together, each wire or rod having a hooked end, the shank portions of each wire being held in alinement, while the end of one rod is bent to form a prod the end of which is bent and disposed at a location adjacent to the looped portions which surround the neck of the animal.

The invention will be hereinafter more fully described and then specifically defined in the appended claim and is illustrated in the accompanying drawings, which, with the letters of reference marked thereon, form a part of this application, and in which—

Figure 1 is a perspective view of the poke. Fig. 2 is a detail view of the parts disconnected.

Reference now being had to the details of the drawings by letter, A designates one of the rods or wires, which has a straight shank portion A', which terminates in a hook B at one end. Said wire is bent to form a coil C and is thence curved, as at D, and again coiled at E, said coil E being in a plane at right angles to the plane in which coil D is disposed. The end of the wire adjacent to the coil E is bent at substantially right angles to the length of the wire and thence is curved, as at F, and terminates in a forked prod G.

The second wire or rod of the poke consists of the wire K, having a straight shank portion K', which is in alinement with the straight shank portion of the wire or rod A in whatever positions the two wires may be turned. At one end of the wire or rod K is formed a hook L. Said rod or wire K is bent to form a curved portion M, and its opposite end is bent at right angles, as at N, and is apertured, as at $n$, to receive a retaining-wire P.

In applying the two rods to make up the poke the shank portion of the rod K has a rotary bearing in the coil E, while the angled end of the rod K is designed to be caught into the coil C, after which the wire P is passed through the aperture $n$ to retain said angled end in the coil C. The prod is so positioned that it will be normally held adjacent to the under side of the neck of the animal, and should the animal come in contact with a fence, the hooked end of the poke striking same, the prod will be forced toward the neck of the animal, while for grazing purposes the prod will not inconvenience the animal.

From the foregoing it will be observed that the poke may be easily and quickly applied to the animal and as easily removed.

Having thus described my invention, what I claim to be new, and desire to secure by Letters Patent, is—

An animal-poke, comprising a rod A having a curved neck-engaging portion and coiled at C, and provided with a straight shank portion A', a second coil horizontally disposed and formed out of said rod A, the lower end of said rod being bent to form a forked prod G, combined with a second rod having a curved neck-engaging portion, the upper end of which is bent at right angles and designed to engage the eye formed by the coil C, and its lower portion passing through the horizontally-disposed coil, and having a straight portion below the neck-engaging part thereof, and held in alinement with the straight portion of the rod A, said rod having a swinging pivotal connection in the lower eye of rod A, as shown and described.

In testimony whereof I affix my signature in presence of two witnesses.

FRANK H. ROBINSON.

Witnesses:
C. B. MADDEN,
R. S. MADDEN.